May 6, 1969     H. ERDMANN     3,442,293

HYDRAULIC ACCUMULATOR WITH COMPOSITE ELASTIC DIAPHRAGM

Filed Jan. 10, 1968

Gas-impermeable Elastomer

Oil-Resistant Elastomer/Synthetic Resin

Hans Erdmann
INVENTOR

BY Karl F. Ross
ATTORNEY 3,442,293
HYDRAULIC ACCUMULATOR WITH COMPOSITE
ELASTIC DIAPHRAGM
Hans Erdmann, Gravenbruch, Germany, assignor to
Alfred Teves G.m.b.H., Frankfurt am Main, Germany, a corporation of Germany
Filed Jan. 10, 1968, Ser. No. 696,885
Claims priority, application Germany, Jan. 26, 1967,
T 33,080
Int. Cl. F16l 55/04
U.S. Cl. 138—30                        10 Claims

ABSTRACT OF THE DISCLOSURE

A hydraulic accumulator whose elastic diaphragm consists of a thin circular layer (planar in the undeflected state of the membrane) of substantially gas-impermeable elastomeric material embedded in a disk of somewhat more permeable material resistant to permanent mechanical deformation and physical or chemical deterioration. The membrane is vulcanized to a metal ring along its periphery and has an undulate cross-section which has its greatest thickness at the center and at the periphery respectively, with a zone of lesser thickness between these areas.

My present invention relates to a gas/liquid hydraulic accumulator comprising a gas-tight elastic diaphragm separating the gas and liquid chambers.

In prior gas/liquid or hydropneumatic accumulators, the potential efficiency is diminished because of the inadequacy of the available diaphragms. The requirement that the thickness of the diaphragm material prevent permeation by the compressed gas, yet be able to tolerate chemical attack and the bending stresses imposed on the material during actual use, resulted in compromise solutions of reduced over-all usefulness. The problem cannot adequately be solved by increasing the membrane thickness, since such increase invariably limits elasticity and yieldability.

It is an object of my present invention to overcome the disadvantages of known hydraulic accumulators by providing a diaphragm of improved simple construction.

Another object of may invention is to equalize the compression stress over the entire surface of the diaphragm and to minimize the bending stress on its periphery, in order to increase the serviceability of such devices.

These objects and others which will become apparent hereinafter are attained, in accordance with the present invention, by providing a thin layer of a separate elastomeric material embedded within the diaphragm body which is vulcanized, to a unitary composite and is attached at its periphery by vulcanization to a metal ring firmly affixed to the accumulator housing in a recess at the fastening screw assembly.

The thin layer, preferably having constant cross-section, consists of methylated caoutchouc or of a material with similar gas-impermeable and elastic properties and is completely impermeable to the applicable gases; the membrane core is sealed off from the stored liquid by the surrounding diaphragm material which need not be impermeable but has to meet only the specifications of strength, elasticity and resistance to attack by the fluids. The metal ring takes up the bending stress imposed upon the periphery of a conventional diaphragm and obviates the need for more complex reinforcement of the diaphragm material around the periphery.

Figure 1:
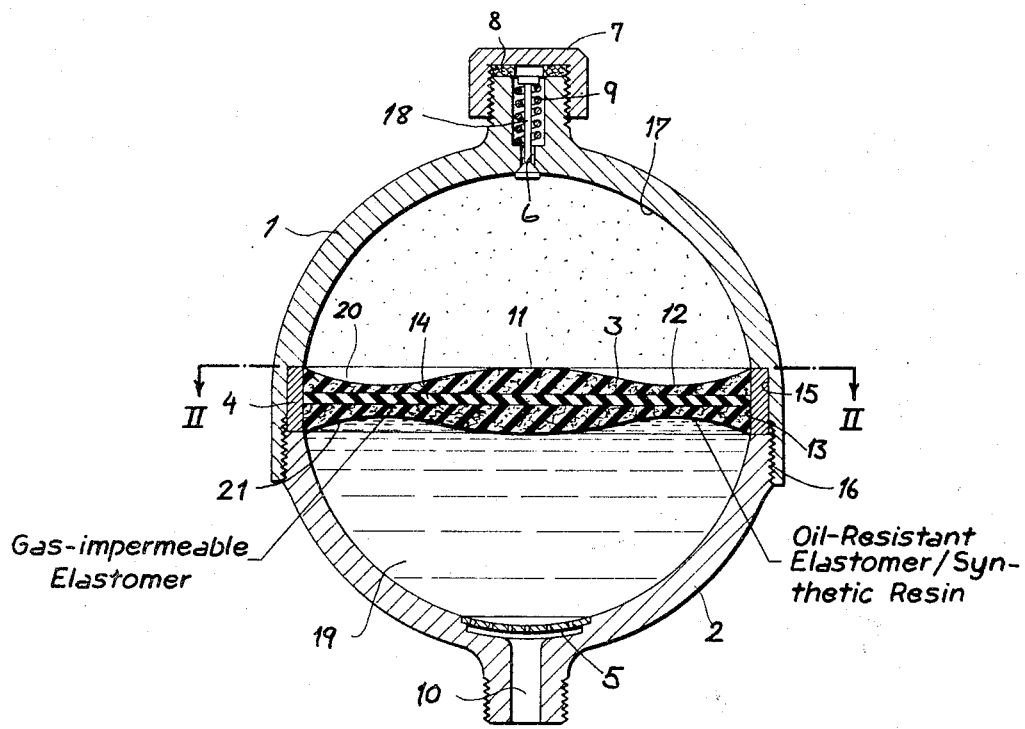
Figure 2:
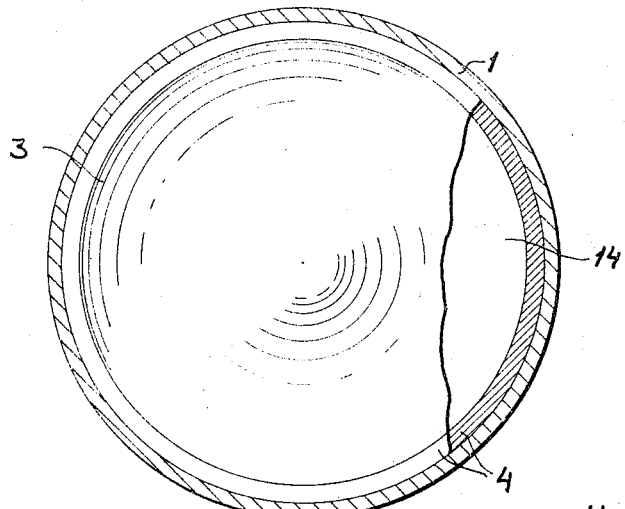

The above and other objects, features and advantages of my invention will become more readily apparent from the following description, reference being made to the accompanying drawing in which:

FIG. 1 is an axial cross-section of a hydraulic accumulator according to my invention; and
FIG. 2 is a cross-sectional view taken along the line II—II of FIG. 1.

In the drawing there is shown an upper hemispherical metal shell threaded onto the lower hemispherical shell at 16; the shells form the housing of a hydraulic accumulator of the type referred to. The vent and gas-charging port 6 of the gas compartment 17 receives a check-valve member 18 urged by the springs 9 into the valve closing position. The vent 6 is made gas-tight during operation by the screw cap 7 and the packing 8. Gas (e.g. air) is supplied under any pressure or is vented to the atmosphere by depressing the valve stem 18 after removal of cap 7. The liquid inlet port 10 of the liquid compartment 19 is faced on the inside by an orifice plate 5.

The circular metal ring 4, which is received in the annular recess 15 formed between the shells 1 and 2, is prevulcanized to the diaphragm body 3 and clamped between the shells when the lower shell 2 is screwed into the upper shell 1. The bulge 11 at the central portion of the diaphragm body 3 of undulate cross-section tapers off radially to a predetermined minimum cross-sectional thickness at intermediate portion 12 and then grows again with divergence of the upper and lower surfaces 20 and 21 of the body, until it has at the periphery 13 substantially the same cross-sectional diameter as at the center which corresponds to the axial thickness of the ring 4. The thickening at the periphery strengthens the attachment of the diaphragm to the ring, since the periphery of the diaphragm body 3 is coextensive with the inner periphery of the ring. The indentation at intermediate portion 12 between the diaphragm cross-sectional diameter at the center 11 and at the periphery 13 is intended to increase the diaphragm surface proportional to the cross-sectional area of the chambers at the center of the accumulator.

The gas-impermeability of the elastomer core layer 14, which is coextensive with the remainder of the diaphragm body but of uniform or constant cross section and wholly embedded in the diaphragm 3, is substantially greater than that of the surrounding material (and is just about total) which, according to my invention, need not be impermeable but must satisfy only the requirements of adequate strength to withstand mechanical stresses and the potentially destructive influence of the hydraulic fluid to which it is exposed. The core layer preferably lies in a median or neutral plane of the body 3 in its undeflected state and is composed of methyl caoutchouc. The surrounding portions of the body may be neoprene, a foam rubber or a foamed resin of conventional type. The composite membrane of this invention can have a thickness materially less than that of a conventional diaphragm where gas penetration is obviated by increased thickness.

The invention described and illustrated is believed to admit of modifications within the ability of persons skilled in the art, such modifications being considered within the spirit and scope of the appended claims.

I claim:
1. A gas-cushion hydraulic accumulator comprising housing means forming a chamber, an elastic diaphragm mounting in said housing means and subdividing said chamber into a closed gas compartment and a liquid compartment, said diaphragm comprising a body with exposed elastomer synthetic resin surfaces in said chamber resistant to mechanical and chemical deterioration and a core layer within said body and coextensive therewith of an elastic material bonded to said elastic synthetic resin and with a gas impermeability greater than that of said surfaces, and a port formed in said housing means and communicating with said liquid compartment for connecting the accumulator to a hydraulic system.

2. The accumulator defined in claim 1 wherein said body has a periphery close to the walls of said chamber and a central portion, said body having a relatively large thickness at said central portion and being of relatively small thickness between said central portion and said periphery.

3. The accumulator defined in claim 2 wherein said body has a thickness along said periphery greater than its thickness intermediate said central portion and said periphery, said surfaces diverging toward said periphery.

4. The accumulator defined in claim 3 wherein said layer is composed of a material having a gas permeability and elasticity of the order of that of methyl caoutchouc.

5. The accumulator defined in claim 1 wherein said housing means is annular and of circular configuration in the region of said body, said diaphragm being of circular configuration and having a metal ring bonded to said body along its periphery, said housing means further comprising means for retaining said ring.

6. The accumulator defined in claim 5 wherein said body is composed at least in part of a vulcanizable elastomer and is bonded to said ring by vulcanization.

7. The accumulator defined in claim 5 wherein said housing means comprises a pair of interconnectable annular metal shells defining an annular recess between them, said ring being received in said recess and clamped between said shells.

8. The accumulator defined in claim 7 wherein the inner diameters of said shells at said recess is equal to the internal diameter of said ring and to the diameter of said body whereby the inner flank of said ring is flush with the inner walls of said shells.

9. The accumulator defined in claim 8 wherein said surfaces diverge toward said periphery and the periphery of said body has a thickness equal to the axial thickness of said ring.

10. The accumulator defined in claim 1 wherein said body is of generally undulate cross section with said surfaces being of symmetrical configuration on opposite sides of said layer, said layer being of constant cross section, said body having a relatively thick central portion, a relatively thin annular intermediate portion surrounding said central portion and a relatively thick annular periphery surrounding said intermediate portion, the thickness of said body throughout its cross section exceeding the thickness of said layer, said body being formed with a continuous metal ring along its periphery and being vulcanized thereto, said metal ring having an axial thickness substantially equal to the corresponding thickness of said body at said periphery, said housing means including a pair of interconnectable generally hemispherical shells of defining between them an annular recess of a cross section corresponding to that of said ring and coextensively receiving same, the diameters of said shells at said ring being substantially equal to the diameter of said body and the internal diameter of said ring, one of said shells being formed with said port, the other of said shells being provided with a vent adapted to communicate between said gas compartment and the atmosphere, check-valve means unidirectionally effective to admit air to said gas compartment and restrict the outflow of air therefrom, and removable closure means for hermetically sealing said vent.

References Cited

UNITED STATES PATENTS

| | | | |
|---|---|---|---|
| 1,885,457 | 11/1932 | Lord et al. | 138—30 |
| 2,851,059 | 9/1958 | Lucien | 138—30 |

FOREIGN PATENTS

| | | |
|---|---|---|
| 32,205 | 5/1927 | France. |
| 77,093 | 4/1954 | Netherlands. |

LAVERNE D. GEIGER, *Primary Examiner.*

IRA C. WADDEY, JR., *Assistant Examiner.*